United States Patent
Ueding et al.

(10) Patent No.: US 11,034,868 B2
(45) Date of Patent: Jun. 15, 2021

(54) HOT-MELT PRESSURE SENSITIVE ADHESIVE COMPOSITION HAVING IMPROVED RHEOLOGICAL PROPERTIES

(71) Applicant: SIKA TECHNOLOGY AG, Baar (CH)

(72) Inventors: Daniel Ueding, Hamburg (DE); Juan Ramón Vila Ferreira, Hamburg (DE); Thomas Hanhörster, Pinneberg (DE)

(73) Assignee: SIKA TECHNOLOGY, Baar (CH)

( * ) Notice: Subject to any disclaimer, the term of this patent is extended or adjusted under 35 U.S.C. 154(b) by 73 days.

(21) Appl. No.: 16/498,742

(22) PCT Filed: May 30, 2018

(86) PCT No.: PCT/EP2018/064228
§ 371 (c)(1),
(2) Date: Sep. 27, 2019

(87) PCT Pub. No.: WO2018/220039
PCT Pub. Date: Dec. 6, 2018

(65) Prior Publication Data
US 2020/0040236 A1      Feb. 6, 2020

(30) Foreign Application Priority Data
May 31, 2017   (EP) .................... 17173737

(51) Int. Cl.
*C09J 153/02*     (2006.01)
*C08F 240/00*    (2006.01)
*C09J 7/38*        (2018.01)

(52) U.S. Cl.
CPC ............ *C09J 153/02* (2013.01); *C09J 7/387* (2018.01); *C08F 240/00* (2013.01); *C09J 2203/00* (2013.01)

(58) Field of Classification Search
CPC .... C09L 53/02; C09L 2205/025; C09J 153/02
See application file for complete search history.

(56) References Cited

U.S. PATENT DOCUMENTS

| 6,214,935 | B1 | 4/2001 | Sasaki et al. |
| 2006/0234580 | A1* | 10/2006 | Sustic ................... B32B 27/08 442/149 |
| 2013/0090421 | A1 | 4/2013 | Vitrano et al. |
| 2020/0095471 | A1* | 3/2020 | Matsuda ............... C08G 18/10 |

FOREIGN PATENT DOCUMENTS

| CN | 103946333 A | 7/2014 |
| CN | 106085309 A | 11/2016 |
| WO | 96/11236 A1 | 4/1996 |
| WO | 00/04108 A1 | 1/2000 |
| WO | 00/14170 A1 | 3/2000 |

OTHER PUBLICATIONS

Aug. 28, 2018 International Search Report issued in International Patent Application No. PCT/EP2018/064228.
Aug. 28, 2018 Written Opinion issued in International Patent Application No. PCT/EP2018/064228.

* cited by examiner

*Primary Examiner* — Jeffrey C Mullis
(74) *Attorney, Agent, or Firm* — Oliff PLC

(57) ABSTRACT

An adhesive compositions containing at least one first styrene-isoprene-styrene block copolymer having a diblock content of not less than 45%, at least one second styrene-isoprene-styrene block copolymer having a styrene content of not more than 30 wt.-%, at least one first tackifying resin having a softening point of equal to or higher than 100° C., and at least one second tackifying resin having a softening point of equal to or higher than 120° C. Further, a method for bonding substrates together using the adhesive composition.

15 Claims, No Drawings

HOT-MELT PRESSURE SENSITIVE ADHESIVE COMPOSITION HAVING IMPROVED RHEOLOGICAL PROPERTIES

TECHNICAL FIELD

The invention relates to an adhesive composition, in particular to a hot-melt pressure sensitive adhesive and use thereof for bonding substrates.

BACKGROUND OF THE INVENTION

Hot-melt adhesives are one-component, water and solvent free adhesives, which are solid at room temperature. These adhesives are applied as a melt and the adhesive bond is established by solidifying on cooling. Due to the relatively short open time, the substrates to be bonded are normally fitted together immediately or few minutes after the application of the adhesive melt. In some applications the waiting time, i.e. the time period between applying the adhesive to the surface of the first substrate and contacting the adhesive film with the second substrate, is relatively long and the adhesive layer must be reactivated by heating. Typically the first substrate coated with the adhesive is cooled and stored for more or less long period of time until the adhesive coating is heated to an application temperature and contacted with surface of another substrate.

Hot-melt adhesives have the advantage of developing a high initial strength immediately after their application upon cooling and they also provide good thermal stability and resistance to environmental influences. State-of-the-Art hot-melt adhesives have the disadvantage that they have to be melted, not only for application, but also for bonding of substrates in case of long waiting times. Also bonding of large surfaces with thin layer of adhesives is typically not possible without additional heating.

Hot-melt adhesives that can be used as pressure sensitive adhesives are also known (PSA-HM). These adhesives can be applied as a melt and they adhere immediately to almost any kind of substrates by application of light pressure. Typically the surface of a PSA-HM adhesive is permanently tacky at normal room temperature and a silicone paper is used as a release liner to avoid unwanted bonding. These types of adhesives have the advantage over conventional hot-melt adhesives that they can be used for bonding of large surfaces with thin adhesive films. Furthermore, in case of long waiting times PSA-HM adhesives can be used without reactivation by heating since the adhesive layer is permanently tacky.

The State-of-the-Art PSA-HM adhesives, in particular the ones based on styrene block copolymers, have the disadvantage of having a narrow application window. The term "application window" refers here to the range of conditions a given adhesive can be used without to provide good bonding properties. In particular, the State-of-the-Art adhesive based on styrene block copolymers typically have a relatively high glass transition temperature ($T_g$) and on the other hand, a relatively low crossover temperature, i.e. the temperature at which the storage and loss moduli cross, or are equal, and tan delta is equal to unity. In case of flexible adhesives, the $T_g$ and the cross over temperature define the lower and upper limits for the temperature range, over which the adhesive can be applied. At temperatures below the $T_g$ the adhesive material becomes brittle and the toughness of the adhesive bond is reduced. At temperatures above the crossover point the adhesive loses its structural integrity, which eventually results in failure of the adhesive bond.

There is thus a need for a PSA-HM adhesive having a broader application window in terms of temperature.

SUMMARY OF THE INVENTION

The objective of the present invention is to provide an adhesive composition having improved elevated temperature heat resistance, cold temperature flexibility, and tackiness. The term "tackiness" refers in the present document to the property of a substance of being sticky or adhesive by simple contact, which can be typically measured as a loop tack.

In particular, it is the objective of the present invention to provide a pressure sensitive hot-melt adhesive composition having a low glass transition temperature and high crossover temperature.

It has been surprisingly found out that an adhesive composition comprising at least one first styrene-isoprene-styrene block copolymer having a high diblock content, at least one second styrene-isoprene-styrene block copolymer having a high isoprene content, at least one first tackifying resin having a softening point of equal to or higher than 100° C., and at least one second tackifying resin different from the first tackifying resin having a softening point of equal to or higher than 120° C., is able to solve the problems related to State-of-the-Art hot-melt adhesive compositions.

One of the advantages of the adhesive composition of the present invention is that it has a relatively broad application window compared to typical State-of-the-art PSA-HM adhesives. The adhesive composition also has a good elevated temperature heat resistance and high bond strength measured by peel force. Still another advantage is that due to the relatively low amount of aromatic resins, the adhesive has a low odor, which makes it suitable for indoor applications, for example, for bonding automotive interior parts.

Other aspects of the present invention are presented in other independent claims. Preferred aspects of the invention are presented in the dependent claims.

DETAILED DESCRIPTION OF THE INVENTION

The subject of the present invention is an adhesive composition comprising:

a) 5-50 wt.-% of at least one first styrene-isoprene-styrene block copolymer having a diblock content of not less than 45%, b) 1-35 wt.-% of at least one second styrene-isoprene-styrene block copolymer different from the at least one first styrene-isoprene-styrene block copolymer and having a styrene content of not more than 30 wt.-%, c) 10-50 wt.-% of at least one first tackifying resin having a softening point of equal to or higher than 100° C., preferably equal to or higher than 120° C., d) 1-30 wt.-% of at least one second tackifying resin different from the at least one first tackifying resin and having a softening point of equal to or higher than 120° C., preferably equal to or higher than 140° C., all proportions being based on the total weight of the adhesive composition.

Substance names beginning with "poly" designate in the present document substances which formally contain, per molecule, two or more of the functional groups occurring in their names. For instance, a polyol refers to a compound having at least two hydroxyl groups. A polyether refers to a compound having at least two ether groups.

The term "molecular weight" designates in the present document the molar mass (g/mol) of a molecule or a part of a molecule, also referred to as "moiety". The term "average molecular weight" refers to the number average molecular weight ($M_n$) of an oligomeric or polymeric mixture of molecules or moieties. The molecular weight may be determined by gel permeation chromatography using polystyrene as standard in a polymer solution in tetrahydrofuran The term "glass transition temperature" refers to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

The term "softening point" refers in the present document to a temperature at which a compound softens in a rubber-like state, or a temperature at which the crystalline portion within the compound melts. The softening point can be measured by a ring and ball method according to DIN EN 1238.

The "amount or content of at least one component" in a composition, for example "the amount of the at least one copolymer" refers to the total amount, i.e. the sum of the individual amounts, of all copolymers contained in the composition. Furthermore, in case the composition comprises 20 wt.-%, based on the total weight of the composition, of at least one copolymer, the sum of the amounts of all copolymers contained in the composition equals 20 wt.-%.

The adhesive composition is preferably a hot-melt adhesive composition, preferably a hot-melt pressure sensitive adhesive composition (HMPSA).

The adhesive composition of the present invention comprises at least one first styrene-isoprene-styrene (SIS) block copolymer having a diblock content of not less than 45%, preferably not less than 50%, more preferably not less than 55%, most preferably not less than 60%, which at least one first styrene-isoprene-styrene block copolymer is present in the adhesive composition in a total amount of 5-50 wt.-%, preferably 10-40 wt.-%, more preferably 10-35 wt.-%, most preferably 15-30 wt.-%, based on the total weight of the adhesive composition.

The adhesive composition of the present invention comprises further comprises at least one second styrene-isoprene-styrene block copolymer different from the at least one first styrene-isoprene-styrene (SIS) block copolymer and having a styrene content of not more than 35 wt.-%, preferably not more than 30 wt.-%, more preferably not more than 25 wt.-%, most preferably not more than 20 wt.-%, which at least one second styrene-isoprene-styrene block copolymer is present in the adhesive composition in a total amount of 1-35 wt.-%, preferably 2.5-30 wt.-%, more preferably 5-25 wt.-%, most preferably 5-20 wt.-%, based on the total weight of the adhesive composition.

The term "styrene content of a block copolymer" refers to a weight percentage of styrene or polystyrene in the block copolymer, and is based on the total weight of the block copolymer. The terms styrene content and polystyrene content can be used interchangeably. The term "diblock content" refers to the amount of SI-diblocks in a styrene-isoprene-styrene block copolymer.

The high diblock content of the at least one first styrene-isoprene-styrene block copolymer enables formulation of soft adhesive compositions, which have improved tackiness compared to adhesive compositions based on SIS block copolymers having low diblock content, for example not more than 30%.

The styrene content of the at least one first SIS block copolymer is not particularly restricted. It might be advantageous that the at least one first SIS block copolymer has a styrene content of 10-45 wt.-%, more preferably of 15-40 wt.-%, based on the total weight of the styrene block copolymer. A styrene content of 20-35 wt.-% is particularly preferable. Alternatively, it may be preferable for the at least one first SIS block copolymer to have a low styrene content. In this case, a styrene content of 10-20 wt.-% and especially 12-15 wt.-% is preferred.

Preferably, the at least one second SIS block copolymer has a diblock content of not more than 35%, more preferably not more than 30%, even more preferably not more than 25%, most preferably not more than 20%.

It may be preferably that the at least one first and the at least one second SIS block copolymers are linear styrene-isoprene-styrene copolymers.

It may be advantageous that the first and second SIS block copolymers have a melt flow index, as determined at 200° C./5 kg of not more than 50 g/10 min, in particular 1-45 g/10 min, preferably 2-40 g/10 min, more preferably 3-30 g/10 min.

Suitable commercially available SIS block copolymers having a diblock content of not less than 45% include, for example, Kraton® D-1113P and Kraton® D-1119P (all from Kraton Performance Polymers). Suitable commercially available SIS block copolymers having a diblock content of not more than 35% and a styrene content of not more than 35 wt.-% include Kraton® D-1111P, Kraton® D-1114P, Kraton® D-1117P, Kraton® D-1161P, Kraton® D-1193P (all from Kraton Performance Polymers).

The adhesive composition of the present invention comprises 10-50 wt.-%, preferably 15-45 wt.-%, more preferably 15-40 wt.-%, most preferably 20-40 wt.-%, based on the total weight of the adhesive composition, of at least one first tackifying resin having a softening point of equal to or higher than 100° C., preferably 120° C. The at least one first tackifying resin may have an average molecular weight ($M_n$) of 250-3,500, preferably 300-2,500, more preferably 500-2,000 g/mol.

The term "tackifying" resin refers to hydrocarbon resins that in general enhance the adhesion and/or tackiness of an adhesive composition. The term "tackiness" refers in the present document to the property of a substance of being sticky or adhesive by simple contact, which can be measured, for example, as a loop tack. Preferred tackifying resins are tackifying at a temperature of 25° C.

Examples of tackifying resins include natural resins, synthetic resins and chemically modified natural resins.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomer or cycloaliphatic monomer include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, dicyclopentadiene, and terpenes. Aromatic monomer can include $C_8$, $C_9$, and $C_{10}$ aromatic monomer. Examples of aromatic monomer include styrene, indene, derivatives of styrene, derivatives of indene, coumarone and combinations thereof.

In particular, suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum based feedstocks are referred in the present document as "petroleum hydrocarbon resins". These include also pure monomer aromatic resins, which are made by polymerizing aromatic monomer feedstocks that have been purified to eliminate color causing contaminants and to precisely control the composition of the product. Petroleum hydrocarbon resins typically have a relatively low average molecular weight, such in the range of 250-5,000 g/mol and a glass transition temperature of above 0° C., preferably equal to or higher than 15° C., more preferably equal to or higher than 30° C.

Examples of suitable tackifying resins may include C5 aliphatic petroleum hydrocarbon resins, mixed C5/C9 aliphatic/aromatic petroleum hydrocarbon resins, aromatic modified C5 aliphatic petroleum hydrocarbon resins, cycloaliphatic petroleum hydrocarbon resins, mixed C5 aliphatic/cycloaliphatic petroleum hydrocarbon resins, mixed C9 aromatic/cycloaliphatic petroleum hydrocarbon resins, mixed C5 aliphatic/cycloaliphatic/C9 aromatic petroleum hydrocarbon resins, aromatic modified cycloaliphatic petroleum hydrocarbon resins, C9 aromatic petroleum hydrocarbon resins, polyterpene resins, and copolymers and terpolymers of natural terpenes as well hydrogenated versions of the aforementioned tackifying resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Preferably, the at least one first tackifying resin is a hydrogenated petroleum hydrocarbon resin having a softening point of equal to or higher than 100° C., more preferably equal to or higher than 120° C. The presence of such hydrogenated petroleum hydrocarbon resin(s) in the adhesive composition has been found out to improve the tackiness without having a negative impact on other properties, such as peel strength, of the adhesive. In particular, adhesive compositions of the present invention containing at least one hydrogenated petroleum hydrocarbon resin, which is present in the adhesive composition in a total amount of 10-50 wt.-%, in particular 15-45 wt.-%, preferably 15-40 wt.-%, most preferably 20-40 wt.-%, based on the total weight of the adhesive composition, have been found out to have excellent tackiness and improved high temperature heat resistance.

Preferably, the at least one first tackifying resin is selected from the group consisting of hydrogenated C5 aliphatic petroleum hydrocarbon resins, hydrogenated mixed C5/C9 aliphatic/aromatic petroleum hydrocarbon resins, hydrogenated aromatic modified C5 aliphatic petroleum hydrocarbon resins, hydrogenated cycloaliphatic petroleum hydrocarbon resins, hydrogenated mixed C5 aliphatic/cycloaliphatic petroleum hydrocarbon resins, hydrogenated mixed C9 aromatic/cycloaliphatic petroleum hydrocarbon resins, hydrogenated mixed C5 aliphatic/cycloaliphatic/C9 aromatic petroleum hydrocarbon resins, hydrogenated aromatic modified cycloaliphatic petroleum hydrocarbon resins, and hydrogenated C9 aromatic petroleum hydrocarbon resins.

Suitable commercially available hydrogenated C5 aliphatic petroleum hydrocarbon resins having a softening point equal to or higher than 100° C. include Eastotac® H-100E, Eastotac® H-115E, Eastotac® H-130E, Eastotac® H-100R, Eastotac®H-115R, Eastotac® H-130R, Eastotac® H-142R, Eastotac® H-100L, Eastotac® H-115L, Eastotac® H-130L, Eastotac® H-100W, Eastotac® H-115W, Eastotac®H-130W, and Eastotac®H-142W (all from Eastman Chemicals) and Escorez® 5300, Escorez® 5320, and Escorez® 5340 (all from Exxon Mobil).

Suitable commercially available hydrogenated C9 aromatic petroleum hydrocarbon resins having a softening point equal to or higher than 100° C. include Regalite® Regalite® S1100, Regalite® S5100, Regalite® S7125, Regalite® R1100, Regalite® R7100, and Regalite® R1125, and Regalite® C6100, as well as Regalrez® 1126, and Regalrez® 6108 (all from Eastman Chemicals); and Arkon® P-100, Arkon® P-125, Arkon® P-115, and Arkon® M-100 (from Arakawa Chemical).

Suitable commercially available hydrogenated cycloaliphatic petroleum hydrocarbon resins having a softening point equal to or higher than 100° C. include Sukorez® SU-100, Sukorez® SU-110, Sukorez® SU-120, and Sukorez® SU-130 (all from Kolon Industries) and Escorez® 5400, Escorez® 5415 (from Exxon Mobil).

Suitable commercially available hydrogenated mixed C5 aliphatic/cycloaliphatic petroleum hydrocarbon resins, hydrogenated mixed C5 aliphatic/cycloaliphatic/C9 aromatic petroleum hydrocarbon resins, and hydrogenated aromatic modified cycloaliphatic petroleum hydrocarbon resins, having a softening point equal to or higher than 100° C. include, for example, Sukorez® SU-210, Sukorez® SU-230, and Sukorez® SU-230S, Sukorez® SU-420, and Sukorez® SU-525 (all from Kolon Industries) and Escorez® 5600, Escorez® 5615, and Escorez® 5637 (all from Exxon Mobil).

According to one or more embodiments, the at least one first tackifying resin is a fully hydrogenated petroleum hydrocarbon resin having a softening point of equal to or higher than 100° C., more preferably equal to or higher than 120° C. Preferably, the fully hydrogenated petroleum hydrocarbon resin is selected from the group consisting of fully hydrogenated C5 aliphatic petroleum hydrocarbon resins, fully hydrogenated cycloaliphatic petroleum hydrocarbon resins, fully hydrogenated mixed C5 aliphatic/cycloaliphatic petroleum hydrocarbon resins, fully hydrogenated mixed C9 aromatic/cycloaliphatic petroleum hydrocarbon resins, fully hydrogenated mixed C5 aliphatic/cycloaliphatic/C9 aromatic petroleum hydrocarbon resins, fully hydrogenated aromatic modified cycloaliphatic petroleum hydrocarbon resins, and fully hydrogenated C9 aromatic petroleum hydrocarbon resins.

The adhesive composition of the present invention further comprises 1-30 wt.-%, preferably 2.5-25 wt.-%, more preferably 5-20 wt.-%, most preferably 5-15 wt.-%, based on the total weight of the adhesive composition, of at least one second tackifying resin different from the at least one first tackifying resin and having a softening point of equal to or higher than 120° C., preferably 140° C. The at least one second tackifying resin may have an average molecular weight ($M_n$) of 500-3,500, preferably 1,000-3,000, more preferably 2,000-3,000 g/mol.

Preferably, the at least one second tackifying resin is a pure monomer aromatic petroleum hydrocarbon resin having a softening point equal to or higher than 120° C., more preferably equal to or higher than 140° C.

The term "pure monomer aromatic petroleum hydrocarbon resin" refers in the present document to aromatic petroleum hydrocarbon resins produced from aromatic monomer feedstocks that have been purified, for example, by distillation and/or thermal soaking. Adhesive compositions of the present invention containing at least one pure monomer aromatic petroleum hydrocarbon resin, which is present in the adhesive composition in a total amount of 1-30 wt.-%, in particular 2.5-25 wt.-%, preferably 5-20 wt.-%, most preferably 5-15 wt.-%, based on the total weight of the adhesive composition, have been found to have a high crossover temperature and improved elevated temperature heat resistance.

Suitable pure monomer aromatic petroleum hydrocarbon resins are commercially available, for example, under the tradenames of Kristalex®, Plastolyn®, Piccotex®, Piccolastic® and Endex® from Eastman Chemicals and under the trade name of Norsolene from Cray Valley. Suitable commercially available pure monomer aromatic petroleum resins having a softening point equal or higher than 120° C. include, for example, Kristalex® 5140, Plastolyn® 290LV, Piccolastic® D125, Endex® 155, and Endex® 160 (all from Eastman Kodak); and Norsolene® W120, Norsolene® W130, and Norsolene® W140 (all from Cray Valley), The adhesive composition may further comprise:

e) 1-35 wt.-%, preferably 5-30 wt.-%, most preferably 5-20 wt.-%, based on the total weight of the adhesive composition, of at least one at 25° C. liquid polyolefin resin.

Preferably, the at 25° C. liquid polyolefin resins has an average molecular weight ($M_n$) in the range of 500-5,000 g/mol, more preferably 1,000-3,000 g/mol, most preferably 1,500-2,500 g/mol, and/or a pour point determined according to ISO 3016, in the range of −10 to +15° C., in particular from −10 to +10° C.

According to one or more embodiments, the at least one at 25° C. liquid polyolefin resin is selected from a group consisting of polyisobutylene (PIB) and polybutene, in particular low molecular weight polyisobutylene and low molecular weight polybutene. The term "polyisobutylene" refers in the present document to polyolefins and olefin oligomers of isobutylene or 2-methyl-1-propene and the term "polybutene" refers in the present document to polyolefins and olefin oligomers comprising isobutylene and/or 1-butene and/or 2-butene.

Suitable commercially available at 25° C. liquid polyisobutylenes include, for example, Indopol® H-300 and Indopol® H-1200 (from Ineos); Glissopal® V230, Glissopal® V500, and Glissopal® V700 (from BASF); Dynapak® poly 230 (from Univar GmbH, Germany); and Daelim® PB 950 (from Daelim Industrial).

The adhesive composition may further comprise:

f) 1-25 wt.-%, preferably 2.5-20 wt.-%, most preferably 5-20 wt.-%, based on the total weight of the adhesive composition, of at least one third tackifying resin different from the at least one first tackifying resin and the at least one second tackifying resin and having a softening point of equal to or higher than 85° C.

Preferably, the at least one third tackifying resin is a non-hydrogenated petroleum hydrocarbon resin. The presence of such non-hydrogenated petroleum hydrocarbon resin(s) in the adhesive composition has been found out to further improve the tackiness without having a negative impact on other properties, such as peel strength and high temperature resistance, of the adhesive.

The non-hydrogenated petroleum hydrocarbon resin is preferably selected from the group consisting of non-hydrogenated C5 aliphatic petroleum hydrocarbon resins, non-hydrogenated mixed C5/C9 aliphatic/aromatic petroleum hydrocarbon resins, non-hydrogenated aromatic modified C5 petroleum hydrocarbon resins, non-hydrogenated cycloaliphatic petroleum hydrocarbon resins, non-hydrogenated mixed C5 aliphatic/cycloaliphatic petroleum hydrocarbon resins, non-hydrogenated mixed C9 aromatic/cycloaliphatic petroleum hydrocarbon resins, non-hydrogenated mixed C5 aliphatic/cycloaliphatic/C9 aromatic petroleum hydrocarbon resins, non-hydrogenated aromatic modified cycloaliphatic petroleum hydrocarbon resins, and non-hydrogenated C9 aromatic petroleum hydrocarbon resins.

According to one or more embodiments, the at least one third tackifying resin is a non-hydrogenated aromatic petroleum hydrocarbon resin, preferably selected from the group consisting of non-hydrogenated mixed C5/C9 aliphatic/aromatic petroleum hydrocarbon resins, non-hydrogenated aromatic modified C5 aliphatic petroleum hydrocarbon resins, non-hydrogenated aromatic modified cycloaliphatic petroleum hydrocarbon resins, and non-hydrogenated C9 aromatic petroleum hydrocarbon resins.

Suitable commercially available non-hydrogenated aromatic petroleum hydrocarbon resins having a softening point equal to or higher than 85° C. include, for example, Wingtack® Plus, Wingtack® Extra, Wingtack® ET, Wingtack® STS, and Wingtack® 86 (from Cray Valley); Piccotac® 8095, Piccotac® 6095E, Picco AR100, Picco® 5120, Picco® 5140, Picco® 6100, Picco® 2215, Picco® A100, Picco® A120, and Picco® A140 (from Eastman Chemicals), Hikotack® P-110S, Hikotack® P-120, Hikotack® P-120S, Hikotack® P-120P, Hikotack® P-120H, Hikotack® P-120HS, Hikotack® P-140, Hikotack® P-150, and Hikotack® C-120 (from Kolon Industries); and Escorez® 2184 (from ExxonMobil).

The at least one non-hydrogenated aromatic petroleum hydrocarbon resin, if used, may be present in the adhesive composition in a total amount of 1-25 wt.-%, preferably 2.5-20 wt.-%, most preferably 5-20 wt.-%, based on the total weight of the adhesive composition.

Preferably, the at least one non-hydrogenated aromatic petroleum hydrocarbon resin has an aromatic content of 1-60%, more preferably 5-40%, even more preferably 5-20%, most preferably 10-20%. The aromatic content can be measured by 1H-NMR as measured directly from the 1H NMR spectrum from a spectrometer with field strength greater than 300 MHz, most preferably 400 MHz (frequency equivalent). Aromatic content is the integration of aromatic protons versus the total number of protons.

According to one or more embodiments, the adhesive composition comprises:

10-35 wt.-% of component a),
5-25 wt.-% of component b),
15-40 wt.-% of component c),
5-20 wt.-% of component d), Optionally 5-30 wt.-% of component e), and Optionally 2.5-20 wt.-% of component f), all proportions being based on the total weight of the adhesive composition.

In addition, the adhesive composition of the present invention can contain additional auxiliary substances and additives, for example, those selected from the group consisting of UV absorption agents, UV and heat stabilizers, optical brighteners, pigments, dyes, and desiccants. Exemplary UV stabilizers that can be included in the hot melt adhesive composition include, for example, sterically hindered phenols. However, the total amount of such additional auxiliary substances and additives is, preferably, not more than 10 wt.-%, more preferably not more than 5 wt.-%, most preferably not more than 2.5 wt.-%, based on the total weight of the adhesive composition.

Preferably, the adhesive composition has a loop tack adhesion at 23° C., measured according to the method as described in the experimental part of the present application, of at least 25 N/25 mm, more preferably at least 30 N/25 mm, most preferably at least 35 N/25 mm.

The adhesive composition according to the invention is prepared by mixing its components at a temperature of 140-220° C., preferably 160-200° C., until a homogeneously mixed mixture is obtained. Any conventional mixing technique known to those skilled in the art may be used. Preferably, the mixing is conducted by using a kneading process. The components a) to d) and the optional components e) and f), if used, can be added to the mixer in any conventional order. Preferably, the first and second SIS block copolymers are first mixed with additives and with the resins c) and d), and optionally resin f), if used. The liquid resin e), if used, is preferably added to a mixed composition of components a) to d) and additives or to a mixed composition of components a) to d) and f) and additives.

Another subject of the present invention is a method for bonding two substrates together, the method comprising steps of:

i) applying the adhesive composition as a melt to a surface of a first substrate, ii) letting the applied adhesive to cool and to solidify, iii) contacting the solidified adhesive with a surface of a second substrate and pressing the substrates together without re-heating the solidified adhesive.

Preferably, in step iii) the substrates are pressed together for a period of at least 1 minute and using a pressure of at least 1 kg/cm².

EXAMPLES

The followings compounds and products shown in Table 1 were used in the examples.

TABLE 1

| | | |
|---|---|---|
| SIS-1 | SIS block copolymer having a diblock content of 66% and a polystyrene content of 20-25 wt.-% | Kraton Polymers |
| SIS-2 | SIS block copolymer having a diblock content of 19% and a polystyrene content of 10-17.5 wt.-% | Kraton Polymers |
| TR-1 | Hydrogenated DCPD hydrocarbon resin having a softening point (ASTM E 28) of 120-130° C. | |
| TR-2 | Pure monomer aromatic hydrocarbon resin having a softening point (ASTM E 28) of 145-155° C. | |
| TR-3 | Aromatic modified C5 hydrocarbon resin having a softening point (ASTM E 28) of 95-105° C. | |

TABLE 1-continued

| | |
|---|---|
| TR-4 | Fully hydrogenated C9 hydrocarbon resin having a softening point (ASTM E 28) of 120-130° C. |
| PB | Liquid polyisobutylene, $M_n$ ~1050 g/mol, flashing point 210° C. |
| Antioxidant | Sterically hindered phenolic antioxidant |
| Stabilizer | Phosphite processing stabilizer |

Preparation of the Adhesive Compositions

For each adhesive composition, the ingredients as presented in Table 1 were mixed at a temperature of 180° C. in a Sigma-kneader. The preparation process was started by mixing of the styrene block copolymers, a small portion of the resins, and the additives. The first mixing step was conducted under $CO_2$-atmosphere and continued for 45 minutes after which the rest of the resins were added and the mixing was continued for 30 minutes under vacuum.

Liquid polyisobutene was then added to mixture and mixing was continued under vacuum for another 30 minutes. The adhesive compositions were stored in siliconized boxes for one day before they were used for characterization of their properties.

Viscosity at 190° C.

The viscosity was measured at a temperature of 190° C. at 10 revolutions per minute using a Brookfield DV-2 Thermosel viscometer with a spindle No. 27. The value of viscosity resulting after twenty minutes of measurements was chosen as the representative measured value.

Softening Point

The softening point was measured by to Ring-And-Ball method according to EN DIN 1238.

Peel Strength

The peel strength is measured according to the test method "FTM 1-Peel Strength" with a measurement velocity of 300 mm per minute. A sample strip with a width of 25 mm is first coated with the adhesive composition and adhered to a stainless steel plate and rolled over with a standard FINAT roller twice in both directions. After twenty minutes contact time the sample is removed from a stainless steel plate with an angle of 180°. The force needed to release the sample from the stainless steel surface is measured. The average value of the recorded forces is the peel strength.

Loop Tack

The loop tack of the adhesive compositions was tested at a temperature of 23° C. using a method "FTM 9-Loop Tack measurement". For the measurement of loop tack, a sample strip having a width of 25 mm and a length of about 200 mm is first coated with the adhesive composition with coating thickness of 100 μm. The sample strip is then formed into a loop and brought into contact with a glass plate moving at a constant speed of 300 mm per minute. As soon as a contact area of 25 mm by 25 mm is created, the loop is withdrawn and the force required to separate the loop from the testing board is recorded. Measured force is recorded as the loop tack. The values for loop tack presented in Table 2 have been obtained as an average from 2 measurements conducted with the same adhesive composition.

SAFT (Shear Adhesion Failure Temperature, PET-Stainless Steel)

A PET specimen with a width of 25 mm and a length of 70 mm is first coated with the adhesive composition with coating thickness of 100 μm. The test sample is bonded to on stainless steel plate with a bonding area of 25×25 mm. A loop is formed with the specimen and fixed with a stapler so that a hook can be inserted into the loop. The sample is fixed in an oven on a special SAFT-rack. The oven is preheated to a temperature of 40° C. A metal weight corresponding to a static load of 500 g is attached to the hook. Two test specimens at a time were placed in the oven for the SAFT measurement.

At the beginning of the measurement, the test specimens are kept in the oven at a temperature of 40° C. for a time period of 30 minutes. Then the temperature of the oven is increased at a rate of 0.37 K per minute. The temperature is increased until the adhesive bonds of all test specimens in the oven failed. The temperature of the oven at the time of adhesion failure is recorded as the respective SAFT value.

The SAFT values presented in Table 2 have been obtained as an average of measurements conducted with two identical test specimens prepared with samples of the same adhesive composition.

Glass Transition Temperature $T_g$ and Crossover Temperature $T_x$

The glass transition temperature was determined as local maximum of the tan delta curve and the crossover temperature was determined as the temperature at which the curves of the loss module and the storage module intersect. The tan delta and loss and storage moduli were determined based on DTMA (Dynamic-Mechanical-Thermal Analysis) measurements, which were conducted using the following DTMA-measurement parameters:

Device: Anton Paar MCR302 SN81765140
Software RHEOPLUS/32 V3.62
Stamp: 25 mm plate (flat surface)
Measurement split: (sample thickness) 1 mm
Temperature ramp: 180 degrees centigrade-(−10) degrees centigrade with −2 degrees centigrade/min
Frequency of oscillation: 1 Hz
Gamma amplitudes: 1 percent (corresponds to 0.8 mrad)

d) 1-30 wt.-% of at least one second tackifying resin different from the at least one first tackifying resin and having a softening point measured by a ring and ball method according to DIN EN 1238 of equal to or higher than 120° C., all proportions being based on the total weight of the adhesive composition.

2. The adhesive composition according to claim 1, wherein the at least one second styrene-isoprene-styrene block copolymer has a diblock content of not more than 35%.

3. The adhesive composition according to claim 1, wherein the first and second styrene-isoprene-styrene block copolymers are linear styrene-isoprene-styrene copolymers.

4. The adhesive composition according to claim 1, wherein the at least one first tackifying resin is a hydrogenated petroleum hydrocarbon resin having a softening point measured by a ring and ball method according to DIN EN 1238 of equal to or higher than 100° C.

5. The adhesive composition according to claim 1, wherein the at least one first tackifying resin has an average molecular weight ($M_n$) in the range of 250-3,500 g/mol.

6. The adhesive composition according to claim 1, wherein the at least one first tackifying resin is a fully hydrogenated petroleum hydrocarbon resin.

7. The adhesive composition according to claim 1, wherein the at least one second tackifying resin is a pure monomer aromatic hydrocarbon resin having a softening point measured by a ring and ball method according to DIN EN 1238 of equal to or higher than 120° C.

8. The adhesive composition according to claim 1, wherein the at least one second tackifying resin has an average molecular weight ($M_n$) in the range of 500-3,500 g/mol.

TABLE 2

| Compositions, [wt.-%] | Ex-1 | Ex-2 | Ex-3 | Ex-4 | Ref-1 | Ref-2 | Ex-5 | Ex-6 | Ex-7 | Ex-8 | Ex-9 | Ex-10 |
|---|---|---|---|---|---|---|---|---|---|---|---|---|
| SIS-1 | 23 | 16 | 16 | 16 | 16 | 32 | 23 | 23 | 23 | 23 | 23 | 23 |
| SIS-2 | 9 | 16 | 16 | 16 | 16 | 0 | 9 | 9 | 9 | 9 | 9 | 9 |
| TR-1 | 0 | 0 | 0 | 0 | 0 | 0 | 10 | 14 | 14 | 14 | 14 | 14 |
| TR-2 | 6 | 6 | 8 | 12 | 0 | 6 | 6 | 6 | 6 | 6 | 6 | 6 |
| TR-3 | 15 | 15 | 15 | 15 | 15 | 15 | 15 | 12 | 8 | 15 | 15 | 15 |
| TR-4 | 29 | 29 | 27 | 23 | 35 | 29 | 19 | 17.5 | 22 | 15 | 15 | 15 |
| PB | 17 | 17 | 17 | 17 | 17 | 17 | 17 | 17 | 17 | 13 | 10 | 23 |
| Antioxidant | 0.75 | 0.75 | 0.75 | 0.75 | 0.75 | 0.75 | 0.75 | 0.75 | 0.75 | 0.75 | 0.75 | 0.75 |
| Stabilizer | 0.25 | 0.25 | 0.25 | 0.25 | 0.25 | 0.25 | 0.25 | 0.25 | 0.25 | 0.25 | 0.25 | 0.25 |
| Viscosity at 190° C., [mPas] | 7200 | 10200 | 13800 | 15400 | 8500 | 12500 | 6800 | 7300 | 6200 | 9200 | 9500 | 4500 |
| $T_{softening}$, [° C.] | 129 | 135 | 143 | 144 | 110 | 125 | 127 | 129 | 126 | 129 | 131 | 119 |
| Peel strength, [N/25 mm] | 40 | 40 | 29 | 14 | 36 | 29 | 34 | 39 | 36 | 32 | 33 | 22 |
| Loop Tack [N/25 mm] | 40 | 37 | 34 | 27 | 15 | 41 | 35 | 36 | 37 | 35 | 38 | 25 |
| SAFT 500 g [° C.] | 89 | 93 | 97 | 97 | 77 | 91 | 91 | 92 | 91 | 92 | 93 | 83 |
| $T_g$, [° C.] | 7 | 9 | 13 | 15 | 2 | 8 | 7 | 6 | 7 | 10 | 12 | 1 |
| $T_{crossover}$, [° C.] | 142 | 144 | 150 | 151 | 122 | 110 | 142 | 140 | 141 | 143 | 143 | 133 |

The invention claimed is:

1. An adhesive composition comprising:
   a) 5-50 wt.-% of at least one first styrene-isoprene-styrene block copolymer having a diblock content of not less than 45%,
   b) 1-35 wt.-% of at least one second styrene-isoprene-styrene block copolymer different from the at least one first styrene-isoprene-styrene block copolymer and having a styrene content of not more than 30 wt.-%,
   c) 10-50 wt.-% of at least one first tackifying resin having a softening point measured by a ring and ball method according to DIN EN 1238 of equal to or higher than 100° C., 9. The adhesive composition according to claim 1 further comprising:
   e) 1-35 wt.-%, based on the total weight of the adhesive composition, of at least one at 25° C. liquid polyolefin resin.

10. The adhesive composition according to claim 9, wherein the at least one at 25° C. liquid polyolefin resin has an average molecular weight ($M_n$) in the range of 500-5,000 g/mol.

11. The adhesive composition according to claim 9, wherein the at least one at 25° C. liquid polyolefin resin is selected from the group consisting of polyisobutylene (PIB) and polybutene.

12. The adhesive composition according to claim 1 further comprising:

f) 1-25 wt.-%, based on the total weight of the adhesive composition, of at least one third tackifying resin different from the at least one first tackifying resin and the at least one second tackifying resin and having a softening point measured by a ring and ball method according to DIN EN 1238 of equal to or higher than 85° C.

13. The adhesive composition according to claim 12, wherein said at least one third tackifying resin is a non-hydrogenated petroleum hydrocarbon resin.

14. The adhesive composition according to claim 1 comprising:

10-35 wt.-% of component a),
5-25 wt.-% of component b),
15-40 wt.-% of component c),
5-20 wt.-% of component d),
optionally 5-30 wt.-% of component e), and
optionally 2.5-20 wt.-% of component f), all proportions being based on the total weight of the adhesive composition.

15. A method for bonding two substrates together, the method comprising steps of:

i) applying the adhesive composition according to claim 1 as a melt to a surface of a first substrate,
ii) letting the applied adhesive to cool and to solidify,
iii) contacting the solidified adhesive with a surface of a second substrate and pressing the substrates together without re-heating the solidified adhesive.

* * * * *